United States Patent
Furuichi et al.

(10) Patent No.: US 12,282,720 B2
(45) Date of Patent: Apr. 22, 2025

(54) FLUID STATE ESTIMATION SYSTEM, LEARNING DEVICE, LEARNING PROGRAM, ESTIMATION DEVICE, AND ESTIMATION PROGRAM

(71) Applicant: CHIYODA CORPORATION, Yokohama (JP)

(72) Inventors: Kazuya Furuichi, Yokohama (JP); Motoki Irikura, Yokohama (JP); Junichiro Kaji, Yokohama (JP); Tatsuro Hori, Yokohama (JP); Nobuhiro Kakuta, Yokohama (JP); Ryo Nakayama, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 18/533,614

(22) Filed: Dec. 8, 2023

(65) Prior Publication Data
US 2024/0273267 A1    Aug. 15, 2024

Related U.S. Application Data (63) Continuation of application No. PCT/JP2022/023180, filed on Jun. 8, 2022.

(30) Foreign Application Priority Data

Jun. 9, 2021 (WO) ............... PCT/JP2021/021900

(51) Int. Cl.
*G06F 30/28* (2020.01)
*G06F 30/27* (2020.01)

(52) U.S. Cl.
CPC .............. *G06F 30/28* (2020.01); *G06F 30/27* (2020.01)

(58) Field of Classification Search
CPC ........... G06F 30/28; G06F 30/27; G06F 30/20
See application file for complete search history.

(56) References Cited

U.S. PATENT DOCUMENTS

2019/0114552 A1* 4/2019 Di Lullo ............... E21B 41/00
2020/0082041 A1  3/2020 Albert
(Continued)

FOREIGN PATENT DOCUMENTS

| JP | 2018041156 A | 3/2018 |
| JP | 2020063955 A | 4/2020 |

(Continued)

OTHER PUBLICATIONS

JPO Decision to Grant a Patent for corresponding JP Application No. 2021-569241; Mailing Date, Mar. 14, 2023.
(Continued)

*Primary Examiner* — Kibrom K Gebresilassie
(74) *Attorney, Agent, or Firm* — CANTOR COLBURN LLP (57) ABSTRACT

A fluid state estimation system includes: a learning device that learns an estimation model for estimating a state of a fluid in at least any one of an inside of a component of a plant, an outside of the component of the plant and an inside of a building of the plant, an outside of the building of the plant and an inside of a site of the plant, and a periphery of an outside of the site of the plant; and an estimation device that estimates a state of a fluid using the estimation model learned by the learning device. The estimation model gets a value of an input variable, and outputs a value of fluid state information representing a state of a fluid.

8 Claims, 8 Drawing Sheets

(56) References Cited

U.S. PATENT DOCUMENTS

2020/0387579 A1\* 12/2020 Barr ........................ G06F 30/27
2021/0319312 A1\* 10/2021 Malaya ................... G06F 17/17

FOREIGN PATENT DOCUMENTS

| JP | 2020118536 A | 8/2020 |
| JP | 2020121241 A | 8/2020 |
| JP | 2020173701 A | 10/2020 |

OTHER PUBLICATIONS

JPO Notification of Reason(s) for Refusal for corresponding JP Application No. 2021-569241, Issued Aug. 30, 2022.
PCT International Preliminary Report on Patentability for corresponding International Application No. PCT/JP2021/021900; dated Nov. 21, 2023; 10 pages.
PCT International Preliminary Report on Patentability for corresponding International Application No. PCT/JP2022/023180; dated Nov. 21, 2023; 12 pages.
International Search Report for corresponding International Application No. PCT/JP2021/021900; dated Sep. 7, 2021; 5 pages.
International Search Report for corresponding International Application No. PCT/JP2022/023180; dated Aug. 30, 2022; 5 pages.
JPO Notification of Reason(s) for Refusal for corresponding JP Application No. 2021-569241, mailed Feb. 22, 2022; 7 pages.

\* cited by examiner

FLUID STATE ESTIMATION SYSTEM, LEARNING DEVICE, LEARNING PROGRAM, ESTIMATION DEVICE, AND ESTIMATION PROGRAM

CROSS REFERENCE TO RELATED APPLICATIONS

This application is a continuation under 35 U.S.C. § 120 of PCT/JP2022/023180, filed Jun. 8, 2022, which is incorporated herein by reference, and which claimed priority to International Application PCT/JP2021/021900, filed Jun. 9, 2021. The present application likewise claims priority under 35 U.S.C. § 119 to International Application PCT/JP2021/021900, filed Jun. 9, 2021, the entire content of which is also incorporated herein by reference.

BACKGROUND OF THE INVENTION

1. Field of the Invention

The present disclosure relates to technology for estimating a state of a fluid.

2. Description of the Related Art

Fluids such as gases and liquids are handled in refineries and chemical plants. If it is possible to grasp a state of a fluid inside an apparatus, a device, a pipe, and the like constituting a plant, it is possible to detect an abnormality during the operation of the plant and to improve operation efficiency by accurately controlling the apparatus and the like. In addition, when a new plant is constructed, it is possible to design a plant in which an abnormality hardly occurs, and operation efficiency is high with reference to the state of the fluid acquired during the operation of the existing plant.

As technology for estimating the state of the fluid in the apparatus or the like, there is, for example, computational fluid dynamics (CFD) or the like (see, for example, Patent Literature 1).

PRIOR ART DOCUMENTS

Patent Literature

[Patent Literature 1] JP 2020-63955 A

SUMMARY OF THE INVENTION

However, since an enormous amount of calculation is required to estimate the state of the fluid with high accuracy by CFD, it is difficult to estimate the state of the fluid in the plant in real time during the operation of the plant.

An object of the present disclosure is to improve technology for estimating a state of a fluid in a plant.

In order to solve the above problem, a fluid state estimation system according to an aspect of the present disclosure includes: a learning device that learns an estimation model for estimating a state of a fluid in at least any one of an inside of a component of a plant, an outside of the component of the plant and an inside of a building of the plant, an outside of the building of the plant and an inside of a site of the plant, and a periphery of an outside of the site of the plant; and an estimation device that estimates a state of a fluid in at least any one of the inside of the component of the plant, the outside of the component of the plant and the inside of the building of the plant, the outside of the building of the plant and the inside of the site of the plant, and the periphery of the outside of the site of the plant using the estimation model learned by the learning device. The estimation model gets a value of an input variable, and outputs a value of fluid state information representing a state of a fluid in at least any one of the inside of the component of the plant, the outside of the component of the plant and the inside of the building of the plant, the outside of the building of the plant and the inside of the site of the plant, and the periphery of the outside of the site of the plant. The learning device includes a learning data acquirer that acquires a set of the value of the input variable and the value of the fluid state information as learning data, and a learner that learns the estimation model on the basis of the learning data. The estimation device includes a fluid state estimator that inputs a specific value of the input variable to the estimation model to estimate a state of a fluid in at least any one of the inside of the component of the plant, the outside of the component of the plant and the inside of the building of the plant, the outside of the building of the plant and the inside of the site of the plant, and the periphery of the outside of the site of the plant when the input variable is the specific value.

Another aspect of the present disclosure is a learning device. This device includes: a learning data acquirer that acquires, as learning data, a set of a value of an input variable capable of affecting a state of a fluid in at least any one of an inside of a component of a plant, an outside of the component of the plant and an inside of a building of the plant, an outside of the building of the plant and an inside of a site of the plant, and a periphery of an outside of the site of the plant, and a value of fluid state information representing a state of a fluid in at least any one of the inside of the component of the plant, the outside of the component of the plant and the inside of the building of the plant, the outside of the building of the plant and the inside of the site of the plant, and the periphery of the outside of the site of the plant; and a learner that learns an estimation model for estimating a state of a fluid in at least any one of the inside of the component of the plant, the outside of the component of the plant and the inside of the building of the plant, the outside of the building of the plant and the inside of the site of the plant, and the periphery of the outside of the site of the plant, on the basis of the learning data.

Still another aspect of the present disclosure is an estimation device. This device includes: a fluid state estimator that inputs a specific value of an input variable to an estimation model to estimate a state of a fluid in at least any one of an inside of a component of a plant, an outside of the component of the plant and an inside of a building of the plant, an outside of the building of the plant and an inside of a site of the plant, and a periphery of an outside of the site of the plant when the input variable is the specific value, the estimation model being learned using, as learning data, a set of a value of the input variable capable of affecting a state of a fluid in at least any one of the inside of the component of the plant, the outside of the component of the plant and the inside of the building of the plant, the outside of the building of the plant and the inside of the site of the plant, and the periphery of the outside of the site of the plant, and a value of fluid state information representing a state of a fluid in at least any one of the inside of the component of the plant, the outside of the component of the plant and the inside of the building of the plant, the outside of the building of the plant and the inside of the site of the plant, and the periphery of the outside of the site of the plant, the estimation model getting the value of the input variable and outputting the value of the fluid state information.

Note that arbitrary combinations of the above components and conversions of an expression of the present invention between a method, a device, a system, a recording medium, a computer program, and the like are also effective as aspects of the present invention.

DETAILED DESCRIPTION OF THE INVENTION

The invention will now be described by reference to the preferred embodiments. This does not intend to limit the scope of the present invention, but to exemplify the invention.

In the present disclosure, technology for estimating a state of a fluid in a plant will be described. In a fluid state estimation system according to an embodiment, in order to quickly and accurately estimate the state of the fluid in the plant, a surrogate model that substitutes CFD is constructed by machine learning, and the state of the fluid is estimated using the constructed surrogate model. As a result, since the state of the fluid in the plant can be estimated much faster than CFD, the state of the fluid in the plant can be grasped in real time during the operation of the plant. In the fluid state estimation system according to the embodiment, the surrogate model is learned by a generative adversarial network (GAN). As a result, since the accuracy of the surrogate model can be improved, the state of the fluid in the plant can be accurately grasped during the operation of the plant.

The technology of the present disclosure can be used to estimate a state of a fluid inside a component of a plant, inside a plurality of components connected in the plant such that the fluid can enter and exit, outside the component of the plant and inside a building of the plant, outside the building of the plant and inside a site of the plant, around the site of the plant (for example, within a range of several km to 10 km, more preferably within a range of 3 km), and the like. The type of the fluid may be, for example, air, a reactant, a leakage substance such as combustible gas or toxic gas, or the like. By the technology of the present disclosure, for example, a flow velocity distribution, a flow direction distribution, a leakage substance concentration, a temperature distribution, and the like can be estimated.

First Embodiment

In a first embodiment, a case of estimating a state of a fluid inside a component of a plant will be described. In the first embodiment, technology for estimating a state of a fluid inside a fluid catalytic cracking (FCC) device will be mainly described.

Figure 1:
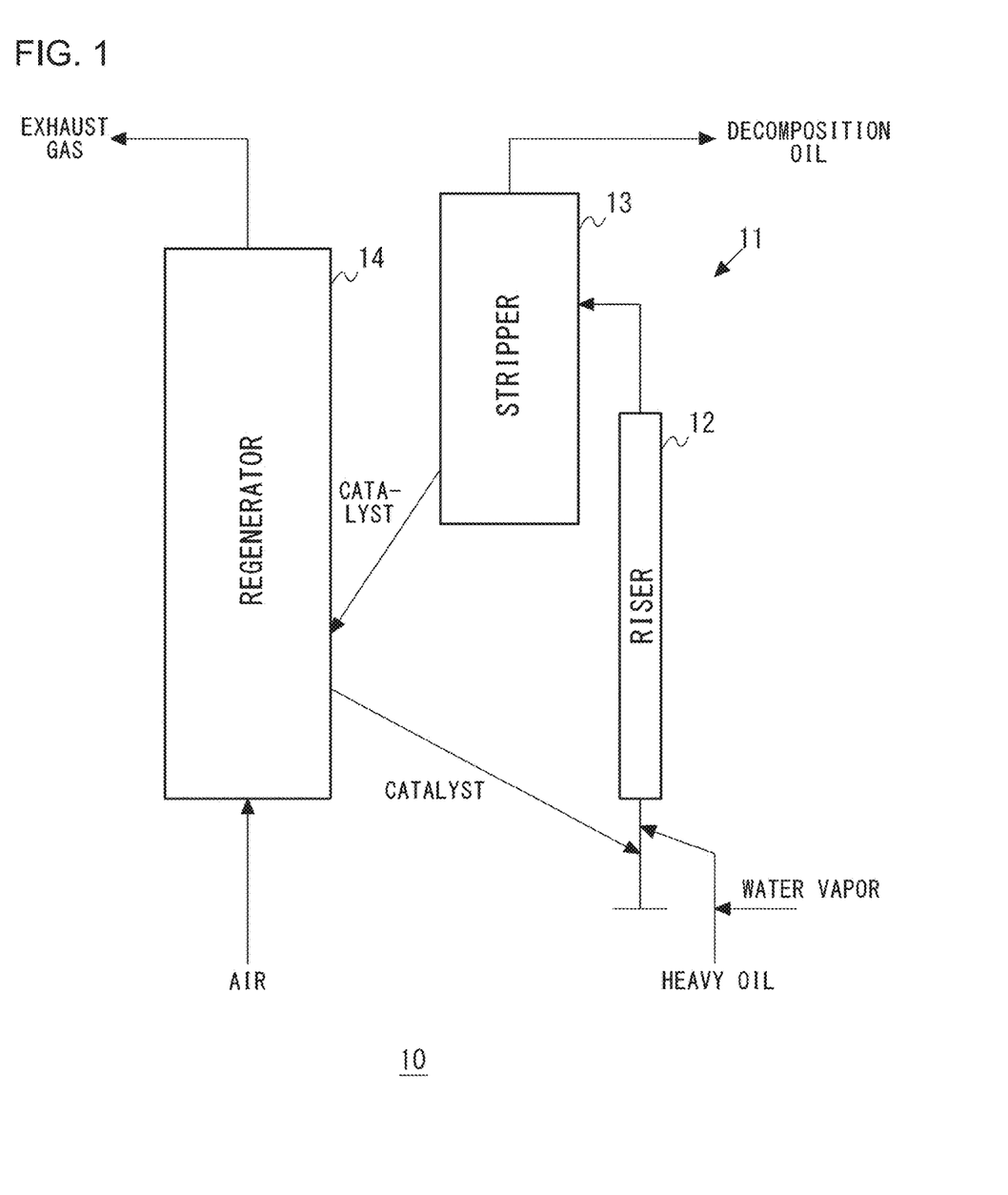
FIG. 1 is a diagram schematically illustrating a configuration of a fluid catalytic cracking device.

FIG. 1 schematically illustrates a configuration of the fluid catalytic cracking device. A fluid catalytic cracking device 10 includes a reactor 11 and a regenerator 14. The reactor 11 includes a riser 12 and a stripper 13.

The riser 12 is a reaction tower for bringing raw oil into contact with a catalyst to obtain a product. The raw oil, the water vapor, and the catalyst are introduced into the bottom of the riser 12. The raw oil may be, for example, a wide range of distillates or residual oils, ranging from lamp oil and light oil to atmospheric residue, with a boiling point higher than that of lamp oil (about 170° C.). The catalyst may be, for example, particles containing zeolite, silica, clay mineral, or the like. The riser 12 decomposes the raw oil at a temperature of, for example, about 500° C., and supplies a decomposition product from the top to the stripper 13.

The stripper 13 introduces steam into the decomposition product supplied from the riser 12 to remove (strip) decomposition oil vapor adhering to the catalyst, separates only the catalyst downward, and supplies the catalyst to the regenerator 14. The decomposition oil extracted from the top of the stripper 13 is further processed and upgraded by a downstream device.

The regenerator 14 regenerates the catalyst used in the riser 12. When the catalyst is used in a decomposition reaction of the raw oil in the riser 12, carbon (coke) adheres to the surface of the catalyst and the catalyst is deactivated. The regenerator 14 regenerates the coke adhering to the surface of the catalyst by burning the coke at a high temperature and supplies the regenerated catalyst to the bottom of the riser 12. The catalyst having the coke attached to the surface thereof and air are introduced into the regenerator 14. Exhaust gas containing carbon dioxide is discharged from the top of the regenerator 14.

In the regenerator 14, when a local amount of air decreases, the coke is incompletely burned due to lack of oxygen, a concentration of carbon monoxide in the exhaust gas increases, and afterburning occurs. When the afterburning occurs, the regenerator 14 may be damaged due to a temperature increase or the like caused by local heat generation, or the operation of the fluid catalytic cracking device 10 may not be continued. Therefore, when the fluid catalytic cracking device 10 is operated, it is important to suppress the occurrence of the afterburning in the regenerator 14.

In the present embodiment, a learning device learns, by machine learning, an estimation model for estimating a value of fluid state information representing a state of a fluid in the fluid catalytic cracking device 10 from information that can be acquired during the operation of the fluid catalytic cracking device 10. Then, an estimation device estimates the value of the fluid state information inside the fluid catalytic cracking device 10 using the learned estimation model during the operation of the fluid catalytic cracking device 10. As a result, an operator can control the fluid catalytic cracking device 10 while accurately grasping the state of the fluid inside the fluid catalytic cracking device 10, so that the occurrence of the afterburning in the regenerator 14 can be suppressed.

Figure 2:
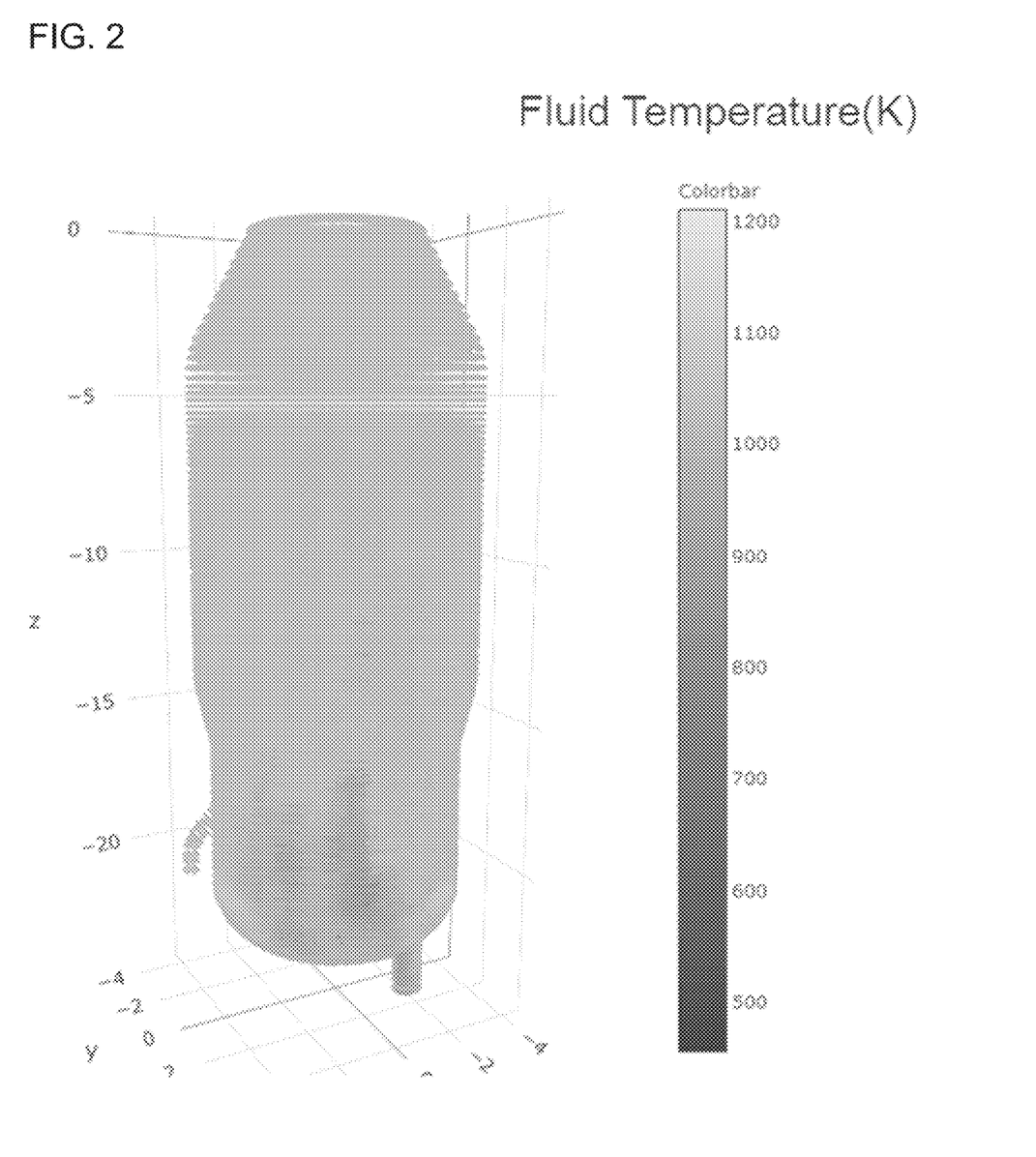
FIG. 2 is a diagram illustrating an example of a three-dimensional distribution of a temperature of a fluid such as raw oil or water vapor in a reactor.

FIG. 2 illustrates an example of a three-dimensional distribution of a temperature of a fluid such as raw oil or water vapor inside the reactor 11. The fluid state estimation system of the present embodiment estimates the three-dimensional distribution of the temperature of the fluid as the fluid state information. Although FIG. 2 illustrates the three-dimensional distribution of the temperature of the fluid inside the reactor 11 (stripper 13), which is one of the components of the fluid catalytic cracking device 10, the fluid state estimation system of the present embodiment can also estimate the state of the fluid inside a plurality of components connected such that the fluid can enter and exit, for example, the stripper 13, the riser 12, and the regenerator 14. Estimating the state of the fluid inside the plurality of components by CFD requires more complicated calculation than estimating the state of the fluid inside a single component, so that the calculation load for estimating the state of the fluid with high accuracy can be enormous. According to the fluid state estimation system of the present embodiment, even in such a case, it is possible to improve the accuracy of estimating the state of the fluid while suppressing an increase in the calculation load.

Figure 3:
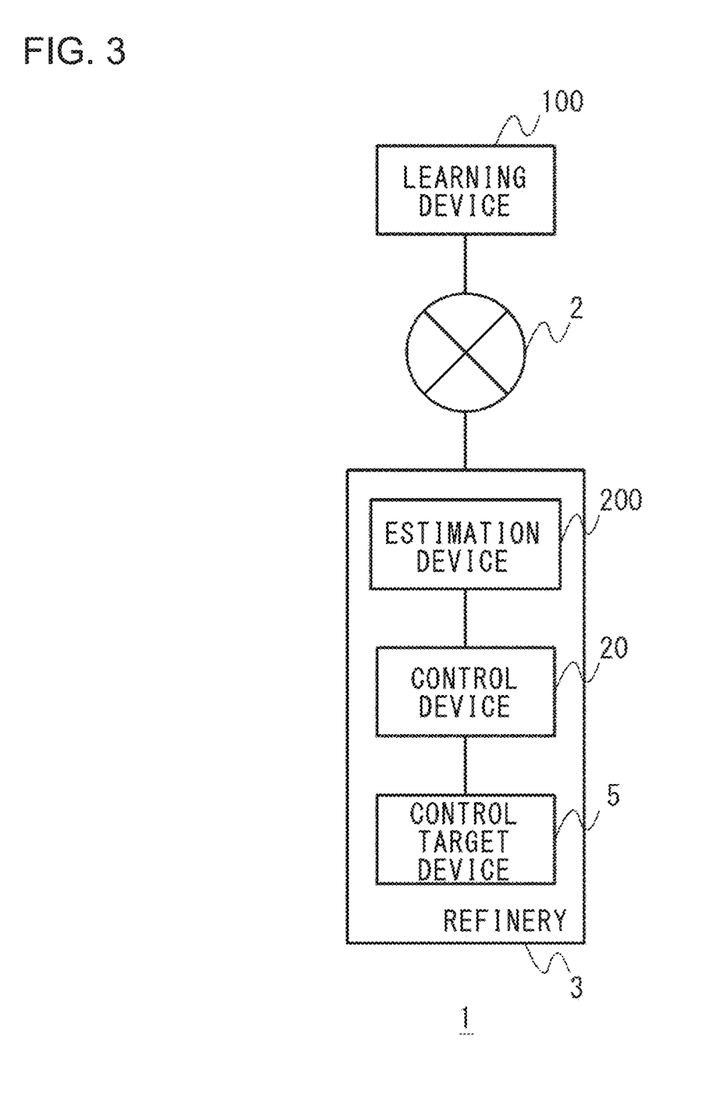
FIG. 3 is a diagram illustrating a configuration of a fluid state estimation system according to an embodiment.

FIG. 3 illustrates a configuration of the fluid state estimation system according to the embodiment. The fluid state estimation system 1 includes a refinery 3 for refining crude oil to produce a petroleum product, and a learning device 100 for learning an estimation model for estimating a state of a fluid inside the fluid catalytic cracking device 10 of the refinery 3. The refinery 3 and the learning device 100 are connected by an arbitrary communication network 2 such as the Internet or an in-house connection system and are operated in an arbitrary operation form such as on-premises, cloud, or edge computing.

The refinery 3 includes a control target device 5 such as an atmospheric distillation device or the fluid catalytic cracking device 10 installed in the refinery 3, a control device 20 that sets a control amount for controlling an operation condition of the control target device 5, and an estimation device 200 that estimates a state of a fluid inside the fluid catalytic cracking device 10 using the estimation model learned by the learning device 100. The estimation model may estimate a two-dimensional distribution or a three-dimensional distribution of values of one or more physical quantities of the fluid, and output image data representing the estimated two-dimensional distribution or three-dimensional distribution of the values of the physical quantities.

Figure 4:
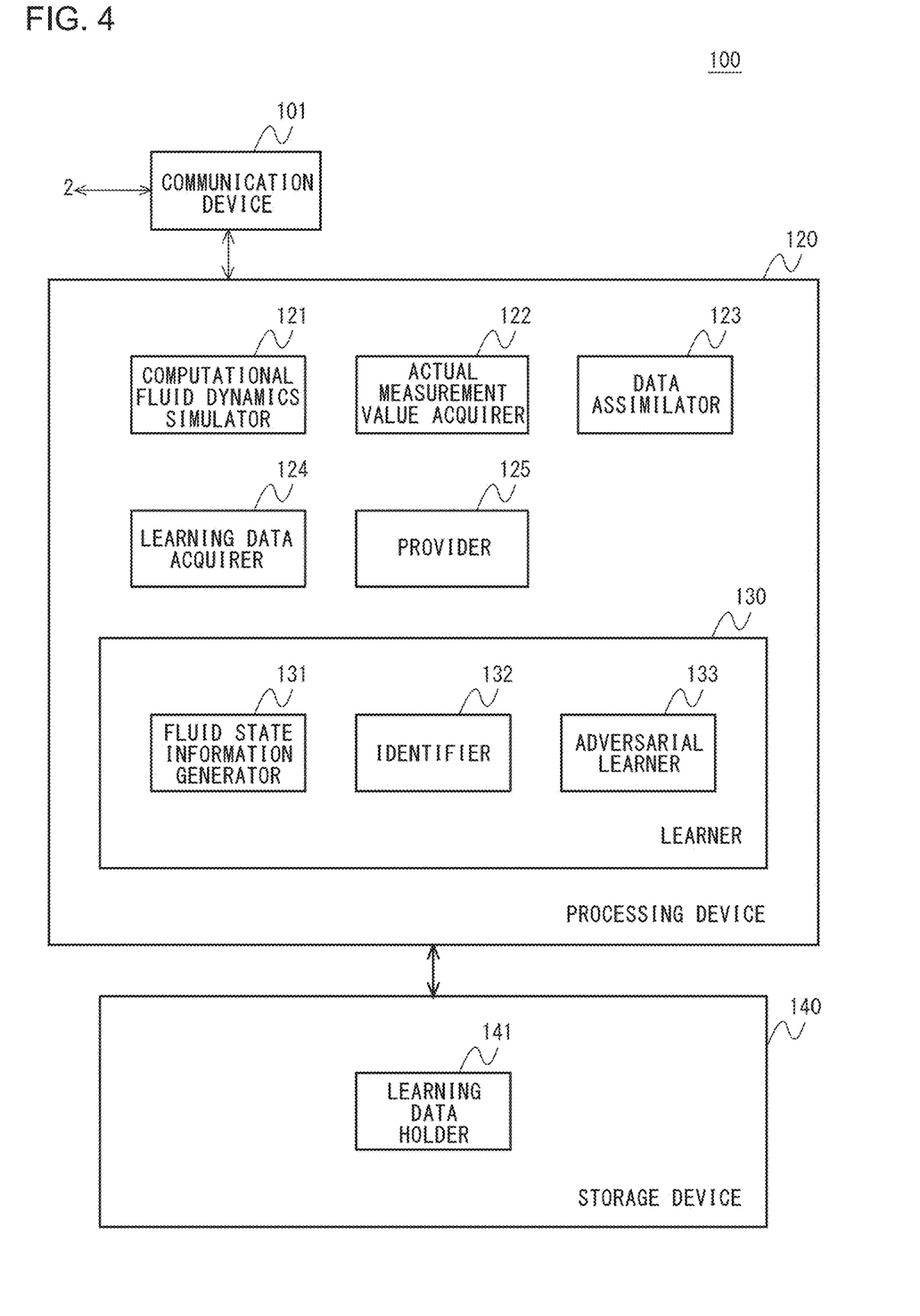
FIG. 4 is a diagram illustrating a configuration of a learning device according to the embodiment.

FIG. 4 illustrates a configuration of the learning device 100 according to the embodiment. The learning device 100 includes a communication device 101, a processing device 120, and a storage device 140.

The communication device 101 controls wireless or wired communication. The communication device 101 transmits and receives data to and from the refinery 3 and the like via the communication network 2.

The storage device 140 stores data and a computer program used by the processing device 120. The storage device 140 includes a learning data holder 141.

The learning data holder 141 holds, as learning data, a set of a value of an input variable that can affect the state of the fluid inside the fluid catalytic cracking device 10 and a value of fluid state information representing the state of the fluid inside the fluid catalytic cracking device 10.

The processing device 120 includes a computational fluid dynamics simulator 121, an actual measurement value acquirer 122, a data assimilator 123, a learning data acquirer 124, a provider 125, and a learner 130. The learner 130 includes a fluid state information generator 131, an identifier 132, and an adversarial learner 133. In terms of hardware components, these configurations are realized by an arbitrary circuit, a CPU of a computer, a memory, a program loaded in a memory, and the like, but here, functional blocks realized by cooperation thereof are illustrated. Therefore, it is understood by those skilled in the art that these functional blocks can be realized in various forms by only hardware, only software, or a combination thereof.

The computational fluid dynamics simulator 121 simulates the state of the fluid inside the fluid catalytic cracking device 10 by computational fluid dynamics. The computational fluid dynamics simulator 121 simulates a two-dimensional distribution, a three-dimensional distribution, or the like of a physical quantity such as a temperature or a pressure of a fluid inside the fluid catalytic cracking device 10 on the basis of values of input variables necessary for simulating a state of the fluid inside the fluid catalytic cracking device 10, such as a coke combustion amount, a catalyst circulation amount, a catalyst refrigerant circulation amount, and an opening of each valve, and generates image data representing a two-dimensional distribution or a three-dimensional distribution of the value of the physical quantity of the fluid. The input variable may be any variable that can affect the state of the fluid in the refinery 3, may be a control amount set by the control device 20, or may be a state variable representing the state of the refinery 3. The computational fluid dynamics simulator 121 may simulate a temporal change in the state of the fluid after the value of the input variable becomes a specific value or may simulate the state of the fluid when the state of the fluid reaches a steady state after the value of the input variable becomes the specific value.

The actual measurement value acquirer 122 acquires an input variable and an actual measurement value of fluid state information when the fluid catalytic cracking device 10 is operated. The actual measurement value acquirer 122 acquires from the refinery 3, a value of an input variable when the fluid catalytic cracking device 10 is operated, and an actual measurement value of a temperature inside the fluid catalytic cracking device 10 detected by a temperature sensor installed in the fluid catalytic cracking device 10 when the fluid catalytic cracking device 10 is operated with the value of the input variable and the internal fluid reaches a steady state. The actual measurement value acquirer 122 may acquire a two-dimensional distribution or a three-dimensional distribution of values of physical quantities of the fluid as image data.

The data assimilator 123 assimilates the calculated value of the fluid state information simulated by the computational fluid dynamics simulator 121 and the actual measurement value of the fluid state information acquired by the actual measurement value acquirer 122. The data assimilator 123 may assimilate the calculated value and the actual measurement value by any method such as direct insertion of inserting the actual measurement value at an installation position of a sensor into a calculation point of the simulation, nudging of multiplying a difference between the actual measurement value and the calculated value by a coefficient and adding it as a forcing term, an optimal interpolation method of statistically performing interpolation so that an error standard deviation is minimized, a three-dimensional variational method of performing interpolation while considering hydrodynamic balance, a Kalman filter assuming normal distribution, linear system, and linear observation, an ensemble Kalman filter accepting non-linear system and non-linear observation, a particle filter not requiring hypothesis for system, observation, and probability distribution, and a four-dimensional variational method of performing interpolation temporally and spatially in consideration of hydrodynamics of the model. The data assimilator 123 may assimilate the calculated value and the actual measurement value using an algorithm configured by a neural network or the like. In this algorithm, the calculated value of the fluid state information simulated by the computational fluid dynamics simulator 121 and the actual measurement value of the fluid state information acquired by the actual measurement value acquirer 122 may be input to an input layer, and the value of the fluid state information assimilated may be output from an output layer. The data assimilator 123 may learn an algorithm by machine learning. The data assimilator 123 may assimilate the image data representing the two-dimensional distribution or the three-dimensional distribution of the value of the physical quantity of the fluid generated by the computational fluid dynamics simulator 121, and the image data representing the two-dimensional distribution or the three-dimensional distribution of the value of the physical quantity of the fluid acquired by the actual measurement value acquirer 122. As described above, by assimilating the calculated value of the fluid state information simulated by the computational fluid dynamics simulator 121 and the actual measurement value, the accuracy of the simulation of the fluid state information can be improved.

The learning data acquirer 124 acquires a set of the value of the input variable and the value of the fluid state information as learning data and stores the acquired learning data in the learning data holder 141. The fluid state information of the learning data may be image data representing a two-dimensional distribution or a three-dimensional distribution of values of the physical quantities of the fluid. The learning data may be generated by the computational fluid dynamics simulator 121 or may be acquired from the refinery 3 when the fluid catalytic cracking device 10 is operated. In a case where the calculated value and the actual measurement value of the fluid state information corresponding to the same value of the input variable are acquired, both of them may be used as the learning data, or they may be assimilated by the data assimilator 123 and used as the learning data. The learning data acquirer 124 may set the value of the input variable and input the value to the computational fluid dynamics simulator 121, acquire the value of the fluid state information corresponding to the value of the input variable, and store the value in the learning data holder 141. In this case, the learning data acquirer 124 may input a combination of values that can be taken by a plurality of types of input variables during the operation of the refinery 3 to the computational fluid dynamics simulator 121. The learning data acquirer 124 may set the value of the input variable according to an experimental design method. For example, the learning data acquirer 124 may set the value of the input variable according to Latin Hypercube Sampling (LHS) for sampling a calculation point so as to have an appearance frequency equivalent to a given probability density distribution. Although the calculation by the computational fluid dynamics simulator 121 requires a large amount of computational load and time, the subject that has been engaged in plant design for many years has already accumulated calculation results by a large number of computational fluid dynamics simulators 121. Therefore, the accuracy of the estimation model can be improved by learning the estimation model using these calculation results.

The fluid state information generator 131 generates a value of the fluid state information from the input data. The fluid state information generator 131 may be an algorithm configured by a neural network or the like. In this algorithm, the value of the input variable or the value of the input data generated from the input variable may be input to an input layer, and the estimated value of the fluid state information when the fluid catalytic cracking device 10 is operated with the value of the input variable and the internal fluid reaches a steady state may be output from an output layer. The fluid state information generator 131 may generate, as the fluid state information, image data representing a two-dimensional distribution or a three-dimensional distribution of values of physical quantities of the fluid.

The identifier 132 identifies the value of the fluid state information generated by the fluid state information generator 131 and the value of the fluid state information acquired by the learning data acquirer 124. In the present embodiment, the identifier 132 identifies information indicating a temperature distribution of the fluid inside the fluid catalytic cracking device 10 generated by the fluid state information generator 131 and information indicating a temperature distribution of the fluid inside the fluid catalytic cracking device 10 acquired by the learning data acquirer 124, and outputs an identification result. The identifier 132 may identify image data representing the two-dimensional distribution or the three-dimensional distribution of the value of the physical quantity of the fluid generated by the fluid state information generator 131 and image data representing the two-dimensional distribution or the three-dimensional distribution of the value of the physical quantity of the fluid acquired by the learning data acquirer 124.

The adversarial learner 133 learns the fluid state information generator 131 and the identifier 132 on the basis of the identification result by the identifier 132 using the generative adversarial network technology. The adversarial learner 133 adjusts parameters and the like of the fluid state information generator 131 in order to minimize the probability that the identifier 132 identifies the value of the fluid state information generated by the fluid state information generator 131 as not the value of the fluid state information acquired by the learning data acquirer 124. The adversarial learner 133 adjusts parameters and the like of the identifier 132 in order to maximize the probability that the identifier 132 correctly identifies whether or not the value of the fluid state information input to the identifier 132 is the value of the fluid state information acquired by the learning data acquirer 124. As such, by repeating the learning of the fluid state information generator 131 and the learning of the identifier 132, the accuracy of the fluid state information generator 131 can be improved. In general generative adversarial network technology, a random number is input to a generator to advance learning. However, in the present embodiment, instead of inputting a randomly generated random number to the fluid state information generator 131, a combination of values that can be taken by a plurality of types of input variables during operation of the refinery 3 is input to the fluid state information generator 131. Therefore, the learning can be more efficiently advanced, and the accuracy of the fluid state information generator 131 can be improved.

The provider 125 provides the learned fluid state information generator 131 to the estimation device 200 as an estimation model.

Figure 5:
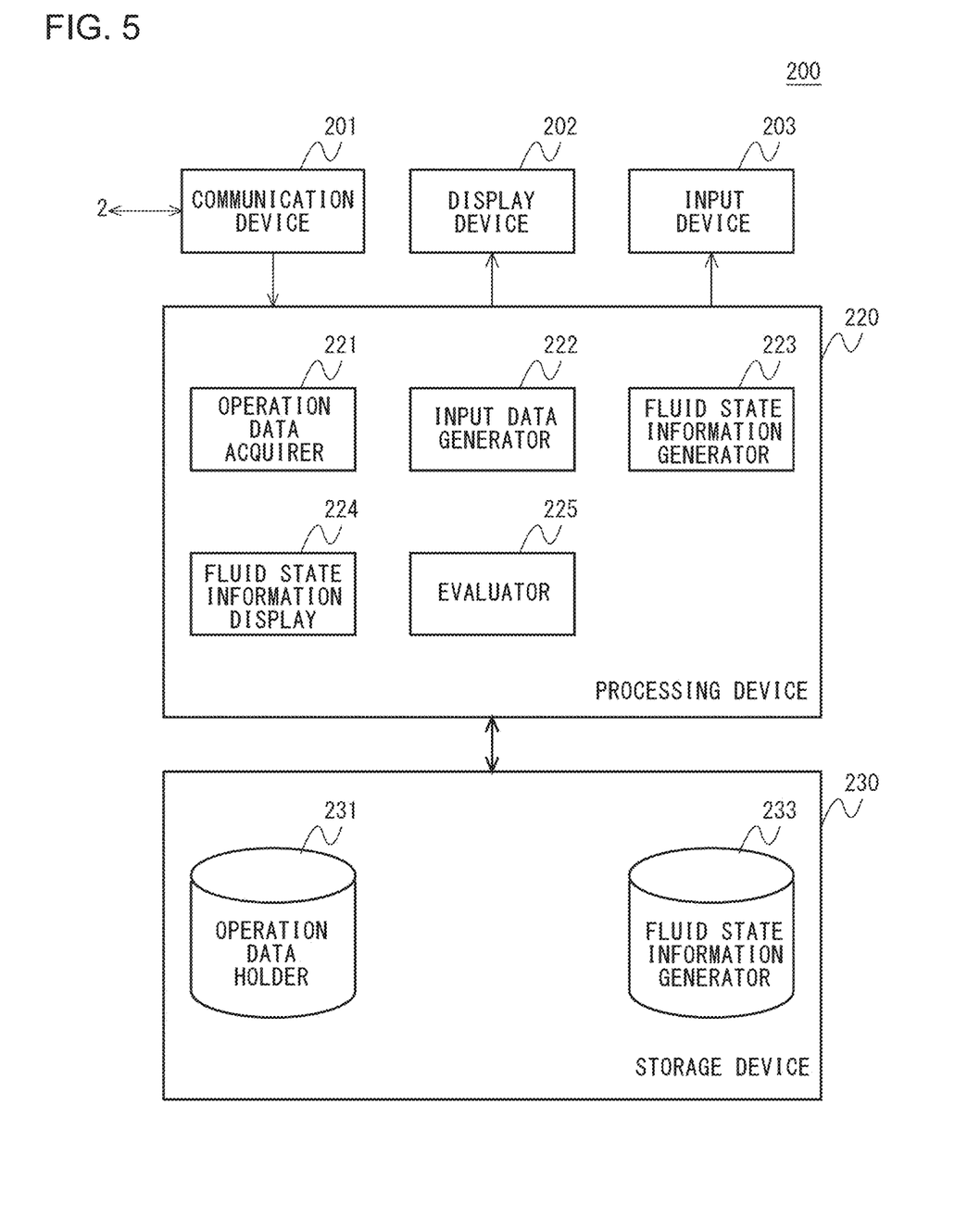
FIG. 5 is a diagram illustrating a configuration of an estimation device according to the embodiment.

FIG. 5 illustrates a configuration of the estimation device 200 according to the embodiment. The estimation device 200 includes a communication device 201, a display device 202, an input device 203, a processing device 220, and a storage device 230.

The communication device 201 controls wireless or wired communication. The communication device 201 transmits and receives data to and from the learning device 100 and the like via the communication network 2. The display device 202 displays a display image generated by the processing device 220. The input device 203 inputs an instruction to the processing device 220.

The storage device 230 stores data and computer programs used by the processing device 220. The storage device 230 includes an operation data holder 231 and a fluid state information generator 233.

The operation data holder 231 stores information acquired when the fluid catalytic cracking device 10 is operated. The fluid state information generator 233 is learned by the learning device 100 and provided from the learning device 100.

The processing device 220 includes an operation data acquirer 221, an input data generator 222, a fluid state information generator 223, a fluid state information display 224, and an evaluator 225. These configurations can be realized in various forms by only hardware, only software, or a combination thereof.

The operation data acquirer 221 acquires a plurality of types of information that can be acquired when the fluid catalytic cracking device 10 is operated from various sensors, apparatuses, devices, facilities, the fluid catalytic cracking device 10, the control device 20, and the like provided in the refinery 3, and stores the information in the operation data holder 231.

The input data generator 222 generates input data to be input to the fluid state information generator 131 from the value of the input variable acquired by the operation data acquirer 221. When the value of the input variable is input to the fluid state information generator 131 as it is, the input data generator 222 may not be provided.

The fluid state information generator 223 generates fluid state information from the input data generated by the input data generator 222 using the fluid state information generator 233. The fluid state information generator 223 functions as a fluid state estimator that estimates a steady state of the fluid when a plurality of types of input variables are specific values. As a result, the estimation device 200 can generate the fluid state information with accuracy equivalent to that of the computational fluid dynamics simulator without using the computational fluid dynamics simulator, so that highly accurate fluid state information can be visualized in real time.

The fluid state information generator 223 may assimilate the calculated value of the fluid state information calculated by the fluid state information generator 233 and the actual measurement value of the fluid state information actually measured when the fluid catalytic cracking device 10 is operated. The operation data acquirer 221 may acquire the actual measurement value of the fluid state information from various sensors, apparatuses, devices, facilities, the fluid catalytic cracking device 10, the control device 20, and the like. As a result, the accuracy of the fluid state information can be further improved.

The fluid state information display 224 displays the fluid state information generated by the fluid state information generator 223 on the display device 202. The fluid state information display 224 displays a two-dimensional distribution or a three-dimensional distribution of a physical quantity such as a temperature or a pressure of the fluid on the display device 202.

The evaluator 225 evaluates a quality of a specific value of the input variable on the basis of the fluid state information generated by the fluid state information generator 223. The evaluator 225 may generate a value of the fluid state information when the input variable is changed to a specific value by the fluid state information generator 223, and display the generated fluid state information on the display device 202. In addition, on the basis of the value of the generated fluid state information, whether or not the input variable should be changed to a specific value may be evaluated and presented to the operator.

Figure 6:
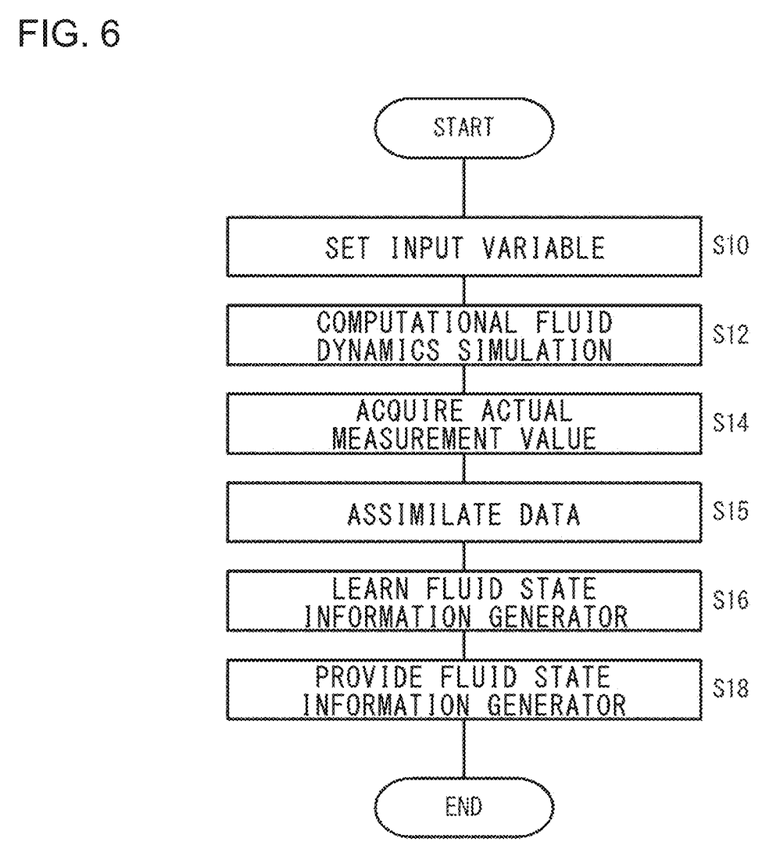
FIG. 6 is a flowchart illustrating a procedure of a learning method according to the embodiment.

FIG. 6 is a flowchart illustrating a procedure of a learning method according to the embodiment. The learning data acquirer 124 of the learning device 100 sets a combination of values that can be taken by a plurality of types of input variables during the operation of the refinery 3 to the computational fluid dynamics simulator 121 (S10). The computational fluid dynamics simulator 121 simulates the state of the fluid inside the fluid catalytic cracking device 10 by computational fluid dynamics and calculates fluid state information (S12). The actual measurement value acquirer 122 acquires an input variable and an actual measurement value of fluid state information when the fluid catalytic cracking device 10 is operated (S14). The data assimilator 123 assimilates the calculated value of the fluid state information simulated by the computational fluid dynamics simulator 121 and the actual measurement value of the fluid state information acquired by the actual measurement value acquirer 122 (S15). The adversarial learner 133 learns the fluid state information generator 131 and the identifier 132 on the basis of the identification result by the identifier 132 (S16). The provider 125 provides the learned fluid state information generator 131 to the estimation device 200 as an estimation model (S18).

Figure 7:
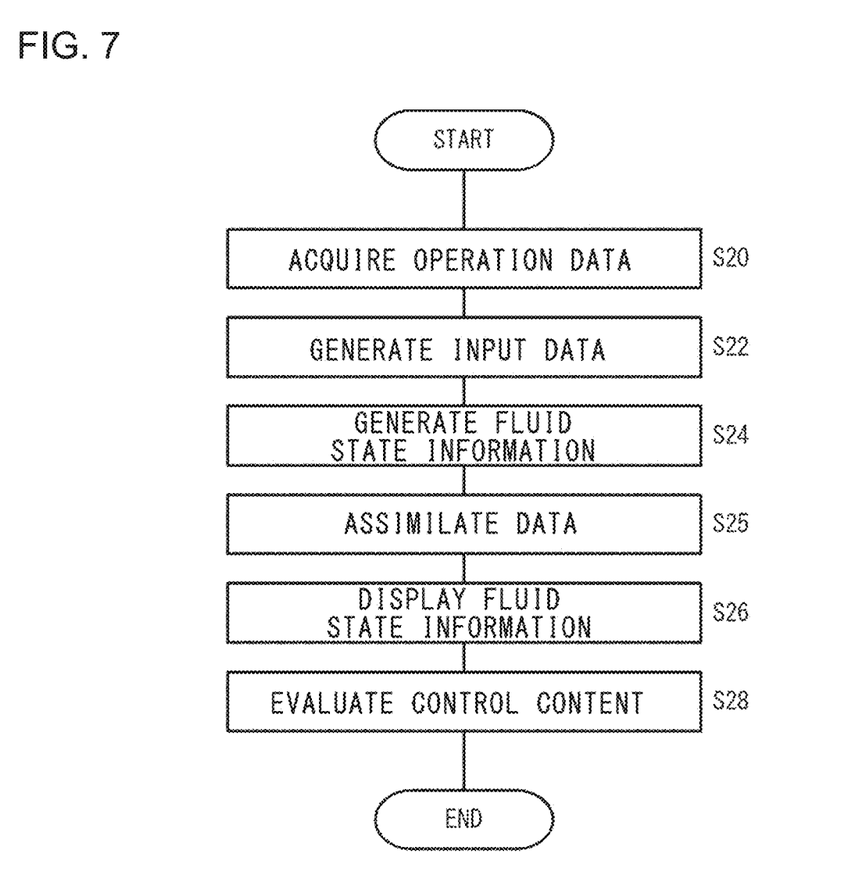
FIG. 7 is a flowchart illustrating a procedure of an estimation method according to the embodiment.

FIG. 7 is a flowchart illustrating a procedure of an estimation method according to the embodiment. The operation data acquirer 221 of the estimation device 200 acquires values of a plurality of types of input variables when the fluid catalytic cracking device 10 is operated (S20). The input data generator 222 generates input data to be input to the fluid state information generator 131 from the value of the input variable acquired by the operation data acquirer 221 (S22). The fluid state information generator 223 generates fluid state information from the input data generated by the input data generator 222 using the fluid state information generator 233 (S24). The fluid state information generator 223 assimilates a calculated value of the fluid state information calculated by the fluid state information generator 233 and an actual measurement value of the fluid state information actually measured when the fluid catalytic cracking device 10 is operated (S25). The fluid state information display 224 displays the fluid state information generated by the fluid state information generator 223 on the display device 202 (S26). The evaluator 225 evaluates a quality of a specific value of the input variable on the basis of the fluid state information generated by the fluid state information generator 223 (S28).

Second Embodiment

In a second embodiment, a case of estimating a state of a fluid outside a component of a plant will be described. In the second embodiment, technology for estimating a state of a fluid discharged from a chimney or the like to the outside of a building or a site of a refinery 3 in the refinery 3 and technology for estimating a state of a fluid leaked to the outside of a component having a relatively high possibility of fluid leakage, such as a pipe flange, will be mainly described. Details of the technology for estimating the state of the fluid are similar to those of the first embodiment.

Figure 8:
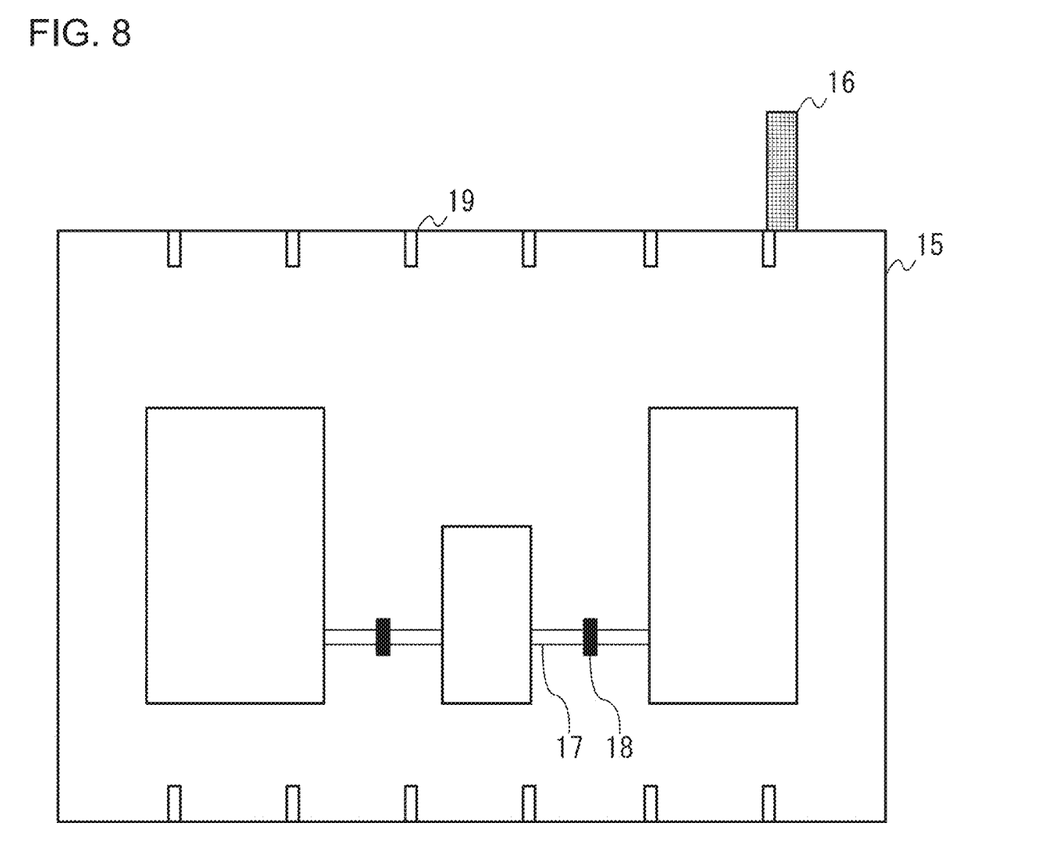
FIG. 8 is a diagram schematically illustrating a configuration of a plant according to the embodiment.

FIG. 8 schematically illustrates a configuration of the plant. The refinery 3 that is a plant for refining petroleum includes a building 15, a plurality of components such as a fluid catalytic cracking device 10 provided inside the building 15, pipes 17 for connecting the plurality of components such that the fluid can enter and exit, pipe flanges 18 provided at connections between the pipes 17, sensors 19 for detecting a concentration of toxic gas or the like leaked from the pipe flange 18 or the like, and a chimney 16 for discharging exhaust gas from the building 15 to the atmosphere. The sensor 19 may be a densitometer for measuring the concentration of the fluid to be detected, or may be a camera, an infrared camera, or the like. An anemometer, an anemometer, an anemoscope, or the like for measuring a wind speed and a wind direction in a site or a periphery of the refinery 3 may be provided.

When the refinery 3 is designed, it is necessary to comprehensively examine whether or not a temperature of the exhaust gas discharged from the chimney 16 and harmful substances such as NOx and SOx in the exhaust gas are sufficiently diffused to a safe level (whether or not the temperature and the concentration are sufficiently reduced) until reaching a place where a person in the site of the refinery 3 enters or the outside of the site, with the wind direction and the wind speed assumed at the place where the refinery 3 is constructed.

A learning device 100 of the present embodiment learns an estimation model for estimating the temperature and concentration of the exhaust gas outside the building 15 of the refinery 3 and inside the site of the refinery 3, or in the periphery of the site of the refinery 3. The estimation model may input, for example, a wind speed, a wind speed distribution, a wind direction, and a wind direction distribution in the site or the periphery of the refinery 3, and a temperature, a discharge amount, and the like of the exhaust gas in each chimney 16 provided in the refinery 3 and output a temperature distribution and a concentration distribution of the exhaust gas in the site or the periphery of the refinery 3. A fluid state information generator 223 of an estimation device 200 estimates a temperature distribution and a concentration distribution of the exhaust gas at various wind directions and wind speeds outside the building 15 of the refinery 3 and inside the site of the refinery 3, or in the periphery of the site of the refinery 3, using the estimation model learned by the learning device 100. A fluid state information display 224 displays the estimated temperature distribution and concentration distribution of the exhaust gas together with a three-dimensional model of the refinery 3. A designer of the refinery 3 refers to the estimated temperature distribution and concentration distribution of the exhaust gas to design the arrangement of the components, the chimney 16, and the like in the refinery 3.

According to a fluid state estimation system 1 of the present embodiment, the state of the fluid outside the building 15 of the refinery 3 and inside the site of the refinery 3, or in the periphery of the site of the refinery 3 can be estimated quickly and with high accuracy, so that the labor and time required for designing the refinery 3 can be reduced.

Not only when the refinery 3 is designed but also when operation conditions of the refinery 3 are changed, when the refinery 3 is modified in accordance with enhancement of production capacity in the refinery 3, when the refinery 3 is refurbished, and the like, the above technology can be used to estimate the temperature distribution, the concentration distribution, and the like of exhaust gas discharged from the chimney 16 of the refinery 3 and the like in the site of the refinery 3 or the periphery of the refinery 3, and to examine types, arrangements, and the like of the components of the refinery 3. In addition, when the refinery 3 is operated, the temperature distribution, the concentration distribution, and the like of the exhaust gas discharged from the chimney 16 and the like of the refinery 3 in the site or the periphery of the refinery 3 can be estimated, and the temperature distribution, the concentration distribution, and the like can be used to change the operation conditions so as to suppress the exhaust amount of the exhaust gas as necessary.

When the toxic gas leaks from the pipe flange 18 or the like after the start of the operation of the refinery 3, it is necessary to quickly detect and handle the leakage.

The learning device 100 of the present embodiment learns an estimation model for estimating a diffusion situation (concentration distribution) of the toxic gas outside the components of the refinery 3 and inside the building 15, or outside the building 15 of the refinery 3 and in the site of the refinery 3. The estimation model may input the concentration of the toxic gas in each of the sensors 19 provided in the refinery 3, the wind speed, the wind speed distribution, the wind direction, the wind direction distribution, and the like in the building 15, the site, or the periphery of the refinery 3, and output the concentration distribution of the toxic gas in the building 15, the site, or the periphery of the refinery 3. An operation data acquirer 221 of the estimation device 200 acquires a result of detecting the concentration of the toxic gas leaked from the pipe flange 18 by the sensor 19. The fluid state information generator 223 estimates the diffusion situation (concentration distribution) of the toxic gas in the building 15 or the site of the refinery 3 on the basis of the wind direction, the wind speed, and the like at that time. The fluid state information display 224 displays the estimated toxic gas diffusion situation together with a photograph and a three-dimensional model of the refinery 3.

Not only when the refinery 3 is operated but also when the refinery 3 is designed, when operation conditions of the refinery 3 are changed, when the refinery 3 is modified in accordance with enhancement of production capacity in the refinery 3, when the refinery 3 is refurbished, and the like, the above technology can be used to estimate the concentration distribution or the like of the toxic gas discharged from the pipe flange 18 or the like of the refinery 3 in the building 15, the site, or the periphery of the refinery 3, and to examine types, arrangements, and the like of the components of the refinery 3.

According to the fluid state estimation system 1 of the present embodiment, when the toxic gas leaks, the diffusion situation of the toxic gas can be grasped quickly and with high accuracy, so that it is possible to handle the leakage more appropriately and early.

The present invention has been described on the basis of the embodiments. The embodiments are merely examples, and it is understood by those skilled in the art that various modifications can be made in the combination of the respective components or the respective processes, and that the modifications are also within the scope of the present invention.

In the embodiment, the technology for estimating the steady state of the fluid in the fluid catalytic cracking device 10 has been described. The technology of the present embodiment can also be used to estimate the state of the fluid inside or outside an arbitrary device or apparatus, the state of the fluid in the entire plant, and the like. In addition, the technology of the present embodiment can be used not only for estimating the steady state of the fluid but also for estimating a temporal change in the state of the fluid, an unsteady state, and the like.

What is claimed is:

1. A fluid state estimation system comprising:
a plurality of components that are connected so that the fluid can enter and exit one another in a plant;
a learning device structured to learn an estimation model for estimating a state of a fluid inside of one of the plurality of components; and
an estimation device structured to estimate the state of the fluid inside of the component of the plurality of components using the estimation model learned by the learning device and inputted to the estimation model by the learning device, wherein
the estimation model is a surrogate model that substitutes a computational fluid dynamics simulator that simulates a two-dimensional distribution or a three-dimensional distribution of one or more physical quantities of a fluid inside the component using computational fluid dynamics;
the estimation model gets a value of an input variable, and outputs a two-dimensional distribution or three-dimensional distribution of the one or more physical quantities as a fluid state information representing the state of the fluid inside of the component,
the learning device includes
a learning data acquirer that acquires, as learning data, a set of the value of the input variable and the value of the fluid state information,
the computational fluid dynamics simulator that simulates the two-dimensional distribution or the three-dimensional distribution of the one or more physical quantities of the fluid inside the component using computational fluid dynamics,
a data assimilator that assimilates a calculated value of fluid state information calculated by the computational fluid dynamics simulator and an actual measurement value of fluid state information measured when a plant is operated, and
a learner that learns the estimation model on the basis of the learning data,
the learning data acquirer acquires, as learning data, the fluid state information generated by the assimilating, by the data assimilator, the calculated value of fluid state information calculated by simulating, by the computational fluid dynamics simulator, a two-dimensional distribution or a three-dimensional distribution of the one or more physical quantities of a fluid inside the component when the input variable is a specific value and an actual measurement value of fluid state information, and
the estimation device includes
a fluid state estimator that inputs a specific value of the input variable to the estimation model to estimate a two-dimensional distribution or a three-dimensional distribution of one or more physical quantities of a fluid inside of the component when the input variable is the specific value.

2. The fluid state estimation system according to claim 1, wherein
the estimation model estimates a steady state of the fluid inside of the component, and
the fluid state estimator inputs a specific value of the input variable to the estimation model to estimate the steady state of the fluid inside of the component when the input variable is the specific value.

3. The fluid state estimation system according to claim 1, wherein
the learner includes
a fluid state information generator that generates a value of the fluid state information from input data,
an identifier that identifies the value of the fluid state information generated by the fluid state information generator and a value of fluid state information acquired by the learning data acquirer, and
an adversarial learner that learns the fluid state information generator and the identifier on the basis of an identification result by the identifier.

4. The fluid state estimation system according to claim 1, wherein
the learning data acquirer acquires a set of a value of a range capable of being taken by the input variable during operation of the plant and a value of the fluid state information as learning data.

5. The fluid state estimation system according to claim 1, wherein
the fluid state estimator assimilates a calculated value of the fluid state information calculated by the estimation model and an actual measurement value of the fluid state information actually measured when the plant is operated.

6. The fluid state estimation system according to claim 1, wherein
the estimation device further includes a fluid state display that displays the state of the fluid in the plant estimated by the fluid state estimator.

7. The fluid state estimation system according to claim 1, wherein
the estimation device further includes an evaluator that evaluates a quality of a specific value of the input variable on the basis of the state of the fluid estimated by the fluid state estimator inside of the component.

8. The fluid state estimation system according to claim 1, wherein
the input variable includes at least a control amount used for control of the components.

* * * * *